Patented Dec. 15, 1953

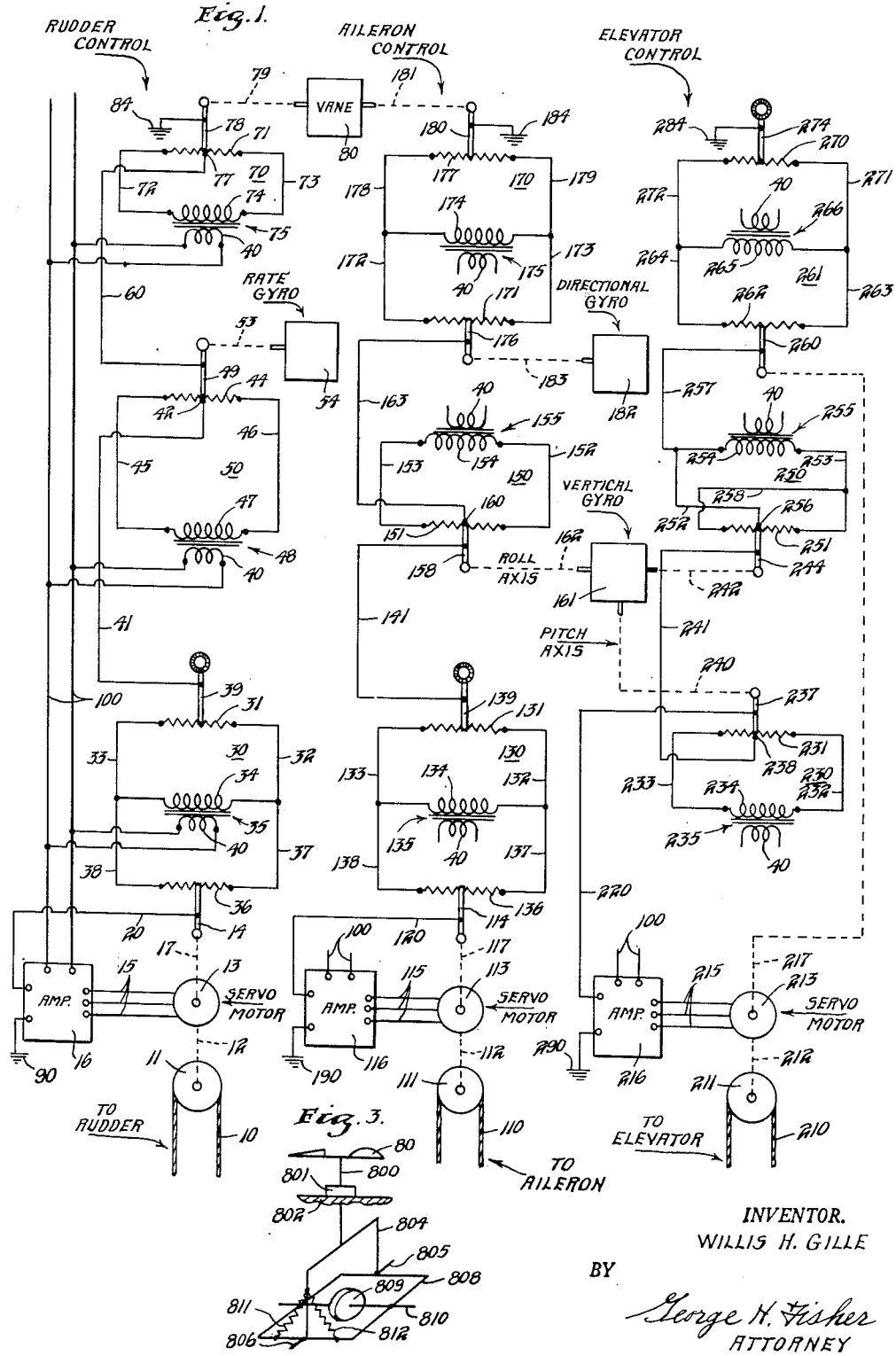

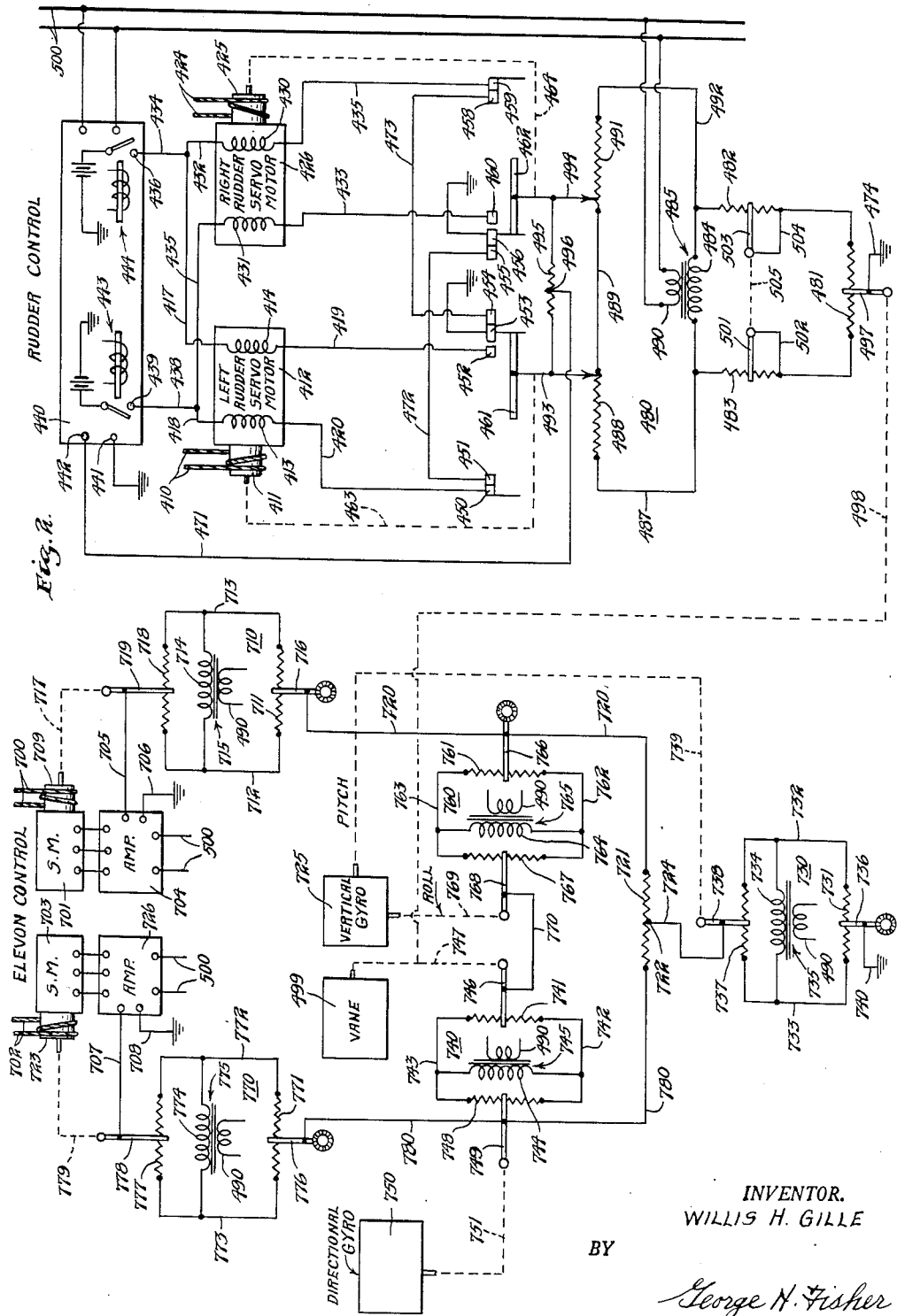

2,662,706

UNITED STATES PATENT OFFICE 2,662,706

AIRCRAFT CONTROL SYSTEM

Willis H. Gille, St. Paul, Minn., assignor to Minneapolis-Honeywell Regulator Company, Minneapolis, Minn., a corporation of Delaware Application February 21, 1947, Serial No. 730,022

16 Claims. (Cl. 244—77)

The object of this invention is to provide a new flight control system for an aircraft.

There is apparatus in existence for stabilizing an aircraft in flight about its turn, its roll and its pitch axes. The aircraft in flight by such existing means may be made to fly in a level position in a desired heading. However, despite such stabilizing means the aircraft may nevertheless be proceeding through the air in an undesirable attitude. By undesirable attitude is meant that the aircraft for example may be skidding through the air although headed in the desired direction. This skidding position may be due to poor directional stability of the aircraft in flight.

It is known that the tail surface of a conventional aircraft due to the streamlining action of the air thereon causes the aircraft to act as a weathercock when in flight and thereby tends to cause the aircraft to head in the direction in which the aircraft is moving. The tail surfaces thereby tend to increase the directional stability of the aircraft. However, such action by the tail surfaces is not completely effective to eliminate this skidding action. The aircraft will, notwithstanding, be at times headed in a different direction from that in which it is moving in the air. The existence of a difference between the direction of heading of the aircraft and direction of movement of the aircraft in air implies that the aircraft is in a condition that is generally known as in yaw. Whenever the aircraft is not headed in the direction in which it is moving relative to the air that impedes its movement it is therefore said to be in yaw.

In one type of aircraft which has no tail surfaces such as in a tailless airplane the directional instability of the aircraft is greater than that of the conventional type of aircraft that is equipped with a tail. Such tailless airplane which is popularly known as a "Flying Wing" consequently tends to fly in a condition of yaw to a greater extent than the conventional airplane.

It is an object of this invention to remove the yaw of an aircraft in flight by the operation of only the rudder of the aircraft, the ailerons being unoperated at this time. The operation of the rudder is adapted to cause the aircraft to head in the direction in which the aircraft is moving. By such operation of the rudder the aircraft tends to align or streamline itself with the direction in which it is moving.

The flight control system that is the subject of this invention further provides a device which detects when the aircraft is in yaw. This yaw detector in turn controls means for operating the rudder. This rudder operation causes the airplane to head in the direction in which it is moving.

When it is desired to change the direction in which the aircraft is moving, the ailerons of the aircraft are operated to effect such change. The direction in which the aircraft is moving is changed by the operation of the ailerons whose operating means for this purpose is placed under control of a deviation responsive means and the yaw detecting means.

The deviation responsive means indicates when the aircraft is headed in a direction different from that previously selected or desired. The yaw detector indicates when the aircraft is headed in a different direction from that in which the aircraft is moving. As long as these indications are the same, the aircraft is actually moving in the desired direction and the ailerons are not operated, but the rudder being under control of the yaw detector is operated to remove the yaw thereby removing both the yaw and the deviation indications. However, when the yaw indication and the deviation indication are not the same, the aircraft is not moving in the desired direction. The yaw indication and the deviation indication thereupon differentially control the operating means for the ailerons which causes the aircraft to bank. The effect of the bank causes the aircraft to turn so that it assumes the desired direction of heading.

A vertical gyroscope is provided which controls means to stabilize the aircraft about the pitch and roll axes of the aircraft and to aid in effecting the proper attitude of the aircraft while it is turning.

An additional gyroscope in one embodiment of the invention coacts with the yaw detecting device in the operation of the rudder to prevent oscillations of the aircraft about the direction it is moving when the rudder is operated to remove yaw.

By the means to be described therefor a novel system of controlling the aircraft in flight is set forth. In this system the function of the rudder which in existing systems had been operated to change the direction in which an aircraft was moving is herein operated only to cause the aircraft to head in the direction in which it is moving. The above function of changing the direction in which the aircraft is moving is no longer in the rudder but in this system to be described has been incorporated in the ailerons.

In the existing systems of flight control, the deviation responsive means gave a control indication when the heading of the aircraft was changed although the aircraft may have been moving in the desired direction. This deviation responsive device also gave an indication when the aircraft, although headed in the direction it was moving, was moving in a different direction from that desired. It is desirable to bank the airplane when the direction in which the aircraft is moving is changed to prevent skidding in a turn. In old systems when the deviation responsive means gave an indication irrespective of the two causes of deviation cited the ailerons as well as the rudder were operated to thereby cause the aircraft to head in the desired direction in one case or to cause the airplane to move in the desired direction in the other case. This operation of the ailerons along with the operation of the rudder causes the airplane to be banked unnecessarily since in the case when it is merely desired to cause the airplane to head in the direction in which it is moving only the rudder need be operated to streamline the aircraft with the direction of relative air or to straighten the plane out.

In the apparatus of this invention, the plane is controlled by the actual direction of movement of the plane as indicated by the vane, and by the directional gyro. Formerly it was assumed that the heading was the same as the direction of movement but this is generally not correct. By using the direction of movement as a base, the plane is banked only when the direction of flight is altered and not when it is desired to align the plane with its flight path. The new system results in the banking of the aircraft only when it is not moving in the desired direction and does not bank the aircraft when it is moving in the desired direction even though it may not be headed in the desired direction. The mere fact that the deviation responsive means shows an indication that the plane is not headed in the desired direction does not of itself control the banking of the aircraft. The aircraft is therefore not unnecessarily banked but is done so only when the direction of movement is changed. The elimination of this unnecessary banking is one of the objects attained by this new flight control system.

Flight control apparatus which embodies the new concept of controlling an aircraft in flight has been arranged for controlling a tailless airplane known as the "Flying Wing." The tailless airplane or "Flying Wing" does not have a tail surface as exists in the conventional type of airplane. The tailless airplane is manipulated in flight through two sets of control surfaces. One set of control surfaces controls the movement of the aircraft about the turn axis. This set comprises two so-called rudders, and in the arrangement, one rudder is mounted near the extremity of each wing tip. In operation, each rudder functions to increase the resistance of the wing in which it is mounted. A turn in either direction may be effected by the operation of the rudder in the wing toward which it is desired to turn. For maximum efficiency in flight, the resistance of the wing should be kept to a minimum, therefore only one rudder is permitted to operate at one time. For example, if in normal flight, it is necessary to carry one rudder partially operated and it is desired to turn in the direction opposite to that side which carries the partially operated rudder control, means are provided which effects the closing of the partially operated rudder before the opposite rudder may be placed in operative position.

The other set of control surfaces controls the movement of the aircraft about both the pitch and the roll axis. This set of control surfaces must therefore act as the conventional ailerons in tilting the plane about its roll axis and also in moving the plane about the pitch axis which is conventionally effected by elevators. The set of control surfaces comprises two control surfaces. One surface is mounted in each wing. A control system has been devised whereby at times these two control surfaces move in the same direction to act as elevators. The control system functions on other occasions to move the control surfaces in opposite directions which movement corresponds to that given the conventional ailerons. Since these control surfaces have both an elevator and an aileron effect on the aircraft, they have been designated elevons.

A further object of this invention is to provide means incorporated in a flight control apparatus for separately controlling the position of two control surfaces for an aircraft each of which effects movement of the aircraft about the same axis.

A further object of this invention is to provide means incorporated in an automatic flight control system for concomitantly adjusting two control surfaces which control the movement of the aircraft about the roll axis, in the same direction.

A further object of this invention is to provide means in an automatic flight control system for concomitantly adjusting two control surfaces which control the movement of the aircraft about the pitch axis, in opposite directions.

Other objects and advantages of this invention will become apparent from a consideration of the specification together with the drawings showing embodiments of the invention or as hereinafter pointed out in the claims.

In the drawings:

Figure 1 illustrates flight control apparatus which embodies the new principle of controlling an aircraft in flight as adapted to the conventional aircraft.

Figure 2 illustrates apparatus embodying the new principle of controlling an aircraft in flight as adapted to a tailless airplane.

Figure 3 shows an arrangement for damping the movements of the vane.

Apparatus for automatically controlling the flight of a conventional aircraft will be considered in the first instance. The conventional aircraft when in flight is controlled about its turn axis by a rudder, about its roll axis by ailerons and about its pitch axis by elevators. The several control surfaces are operated from control channels which are so indicated in Figure 1. In Figure 1 the rudder, aileron and elevator control channels are illustrated respectively from left to right. The respective channels will be described in this order.

The rudder control surface which is not shown is operated by cables 10 extending from the cable drum 11. The cable drum 11 is driven by servomotor 13 by means of shaft 12. Servomotor 13 may reversibly drive shaft 12 and the motor is controlled from an amplifier 16 through its connecting leads 15. The servomotor 13 may be of the type disclosed in my copending application Ser. No. 447,989, filed June 22, 1942. The amplifier 16 may also be of the type disclosed in the above noted application. The direction of rotation of servomotor 13 depends upon and varies with the phase of the input control signal to amplifier 16 with respect to the alternating plate current supplied to amplifier 16 from a source 100. The source 100 may be an inverter not shown or any other suitable source of alternating voltage.

The control signal to the amplifier 16 is obtained from a circuit including a series of connected networks 30, 50 and 70. The signal circuit extends from amplifier input lead 20, impedance network 30, lead 41, impedance network 50, lead 60, impedance network 70 to ground 84 and to ground 90 of amplifier 60.

The impedance network 30 may be designated the circuit balancing network and is in the form of a Wheatstone bridge. Two legs of this bridge are formed by a centering resistor 31 whose opposite ends are connected by leads 32 and 33 to the ends of a secondary 34 of a transformer 35. The primary 40 of the transformer 35 is connected to the source of voltage 100. Since the several networks to be described have secondary windings that may have a common primary winding, the primary winding is indicated in each instance by the reference character 40. The opposite two legs of the Wheatstone bridge are formed by a servo balance resistor 36 which has its opposite ends connected through leads 37 and 38 to the respective ends of secondary winding 34. A wiper 39 may be manually adjusted along the surface of resistor 31 and a wiper 14 which is connected to the amplifier input 20 may be adjusted along the surface of resistor 36. The wiper 14 is driven from the servomotor 13 through a follow-up connection 17.

Wipers 14 and 39 are normally at the electrical centers of their respective resistors. When so positioned, the wipers 14 and 19 are at the same potential and no voltage signal exists between these wipers. If wiper 39 be manually displaced from its electrical center in one direction or sense, wiper 14 must be displaced by the same amount in the same direction or sense in order that the wipers 14 and 39 be at the same potential so as to provide no signal voltage between them. Wiper 39 may be adjusted by hand as desired and wiper 14 must be similarly moved to a point of equal potential with respect to wiper 39 to balance network 30. Since wiper 14 is connected to the driving means for the rudder, the adjustment of wiper 14 will alter the position of the rudder. Wiper 39 may therefore be variously moved to unbalance network 30 and the adjustment of wiper 14 to rebalance is also effective to position the rudder where desired, but it is generally adjusted so that the rudder is in center position. For this reason wiper 39 with its resistor 31 are often termed the centering means.

The impedance network 50 is a source of angular rate signal and has its operative portion in the form of a potentiometer. This potentiometer comprises a resistor 44 whose ends are connected through leads 45 and 46 to the respective ends of the secondary 47 of a transformer 48. The primary 40 of transformer 48 is connected to a source of voltage 100. A lead 41 extends from wiper 39 of impedance network 30 to a center tap 42 of resistor 44. A wiper 49 may be adjusted along the surface of resistor 44 with respect to center tap 42 to vary the potential between the wiper and center tap. The wiper 49 is normally at center tap 42 but is adjusted relative thereto through an operative connection 53 from a rate gyro 54.

The rate gyro 54 may be a spring restrained gyro similar to the conventional gyroscopic rate of turn indicator. Such gyroscopic turn indicator has a cardan ring which is supported on horizontal trunnions extending from the ring. The precessing action of the gyroscope when the aircraft is turning about its turn axis causes the rotation of the trunnions. Such rotation of the trunnions may be applied through mechanical connection 53 to wiper 49.

A lead 60 extends from wiper 49 to a center tap 77 of a resistor 71 which forms part of vane controlled impedance network 70. Impedance network 70 includes a potentiometer whose resistor 71 has its opposite ends connected by means of leads 72 and 73 to the respective ends of a secondary 74 of a transformer 75. The primary 40 of the transformer 75 is connected to source 100. A wiper 78 may be positioned along the surface of resistor 71 with respect to center tap 77 to vary its potential with respect to the center tap 77. The wiper 78 is so positioned from a vane 80 through an operative connection 79.

The vane 80 may be similar to the type shown in Patent 1,119,324 dated December 1, 1914. Such vane is adapted to pivot by the action of the airstream thereon. The extent of vane movement is a measure of the differential air pressure on opposite sides of the fuselage. Any pivotal action of the vane is transmitted through the operative connection 79 to the wiper 78. Wiper 78 of network 70 is connected to ground 84 and is therefore common with ground 90 of amplifier 16.

The vane may have its shaft 79 damped by a conventional dashpot to prevent oscillations of the shaft or the shaft may be operated by a gyro which is slaved to the vane similar to the slaving action of a gyromagnetic compass.

The ailerons, not shown, of the aircraft are connected to cables 110 which are driven from cable drum 111. Cable drum 111 is reversibly driven by servomotor 113 by means of shaft 112. Servomotor 113 is similar to the servomotor 13. Servomotor 113 is reversibly controlled from an amplifier 116 through its connecting leads 115. Amplifier 116 is similar to amplifier 16. The control signal for amplifier 116 is obtained from a circuit extending from lead 120, network 130, lead 141, network 150, lead 163, network 170, ground 184 and to ground 190 of amplifier 116.

Input lead 120 from amplifier 116 extends to wiper 114 of the impedance network 130 which is designated the circuit balancing network. The impedance network 130 is in the form of a Wheatstone bridge. Two legs of this bridge are formed by a centering resistor 131 which has its opposite ends connected through leads 132 and 133 to the respective ends of a secondary 134 of a transformer 135. Transformer 135 has a primary winding 40. A wiper 139 may be manually adjusted over the surface of resistor 131. The other two legs of the Wheatstone bridge are formed by a servo balance resistor 136 which has its ends connected through leads 137 and 138 to the respective ends of secondary 134. The wiper 114 may be positioned along the surface of resistor 136 through a follow-up connection 117 from servomotor 113. Wipers 114 and 139 are normally at the electrical center of their respective resistors 136 and 131. If one wiper be displaced from its electrical center the wipers 114 and 139 will not be at the same potential and a signal voltage will be derived due to the difference in potential. Wiper 139 may be manually adjusted along resistor 131. The movement of wiper 114 which is necessary to place wipers 139 and 114 at the same potential is also applied to the ailerons not shown. Wiper 139 may be therefore moved to unbalance network 130 and the movement of wiper 114 to balance the network is effective to adjust the normal position of the ailerons. Generally the ailerons are adjusted into the central position and as so used the wiper 139 with its resistor 131 is termed the centering means for the ailerons.

The lead 141 extends from wiper 139 to a wiper 158. The impedance network 150 which is the transverse stabilizing network and which includes wiper 158 comprises a resistor 151 whose opposite ends are connected through leads 152 and 153 to the respective ends of a secondary winding 154 of a transformer 155. The transformer 155 has a primary 40. Wiper 158 may be positioned along the surface of resistor 151 and receives such movement from a vertical gyro 161 through an operative connection 162. The vertical gyro 161 may be of the type disclosed in my aforementioned application Ser. No. 447,- 989. The movement applied to connection 162 from the vertical gyro 161 results from movement of the aircraft about its roll axis. Resistor 151 has a center tap 160, and in normal position, wiper 158 is at the center tap. The wiper 158 may be displaced to either side of center tap 160 and when so positioned in any half cycle would select positive or negative voltage with respect to the center tap. The center tap 160 is connected through lead 163 to a wiper 176 of a flight direction control impedance network 170.

The impedance network 170 is in the form of a Wheatstone bridge. Two legs of this bridge are formed by a vane responsive resistor 177 whose opposite ends are connected through leads 178 and 179 to the respective ends of a secondary 174 of a transformer 175. The transformer 175 has a primary 40. The other two legs of this bridge are formed by a directional gyro responsive resistor 171 whose respective ends are connected through leads 172 and 173 to the ends of secondary 174. Wiper 176 may be positioned along the surface of resistor 171. Such position is obtained from a directional gyro 182 through operative connection 183. The directional gyro may be of the type disclosed in my application Ser. No. 447,989, mentioned above. A wiper 180 may be positioned along the surface of resistor 177. The positioning of wiper 180 is obtained from vane 80 through an operative connection 181. Wiper 180 is connected to ground 184.

The elevators, not shown, are connected to cables 210. Cables 210 are driven from the cable drum 211. Cable drum 211 is reversibly driven from a servomotor 213 by means of operative connection 212. The servomotor 213 is reversibly controlled from an amplifier 216 through leads 215. The amplifier 216 and servomotor 213 are similar to those in the rudder and aileron control channels. The input signal for controlling the amplifier 216 is derived from a control circuit which extends from input lead 220 of the amplifier, impedance network 230, lead 241, impedance network 250, lead 257, impedance network 261, ground 284 and to ground 290 of amplifier 216.

The lead 220 from the input of the amplifier extends to wiper 237 of a longitudinal stabilizing impedance network 230. The impedance network 230 comprises a resistor 231 having its opposite ends connected through leads 232, 233 to the respective ends of a secondary 234 of a transformer 235. The transformer 235 has a primary winding 40. A wiper 237 may be positioned along the surface of resistor 231. The wiper 237 is driven from vertical gyro 161 through operative connection 240. The movement given to wiper 237 from gyro 161 is the result of movement of the aircraft about its pitch axis. The resistor 231 has a center tap 238. Normally wiper 237 is positioned at the center tap. The wiper 237 may be moved in either direction with respect to the center tap, and in any half cycle, its potential with respect to the center tap 238 varies with its direction of movement relative thereto.

The center tap 238 is connected through lead 241 to wiper 244 of up elevator impedance network 250. Impedance network 250 comprises a resistor 251 having one end connected through lead 253 to one end of secondary 254 of a transformer 255. The transformer 255 has a primary 40. The opposite end of resistor 251 is connected through a lead 253 to lead 253 so that both ends of resistor 251 are connected to the same end of secondary 254. The opposite end of secondary 254 is connected through a lead 252 to a center tap 256 of resistor 251 and through lead 257 to a wiper 260 of a control circuit balance network 261. Wiper 244 is normally positioned at the center tap 256 of resistor 251 when they are at the same potential. It may be seen that in any half cycle and for a given movement that irrespective of the direction in which wiper 244 is moved with respect to its center tap 256 the difference of potential between wiper 244 and center tap 256 is the same.

The impedance network 261 which constitutes the control circuit rebalancing network is in the form of a Wheatstone bridge. Two legs of the bridge are formed by a resistor 262 whose opposite ends are connected through leads 263 and 264 to the respective ends of a secondary 265 of a transformer 266. The transformer 266 has a primary winding 40. An adjustable wiper 260 contacts the surface of resistor 262. The other two legs of the bridge are formed by a servo balance resistor 270 which has its opposite ends connected to the respective ends of secondary 265 through leads 271, 272. A wiper 274 may be manually adjusted over the surface of resistor 270. The wiper 274 is connected to ground 284. The wiper 260 previously mentioned is driven from the follow-up connection 217 extending from servomotor 213. Wipers 260 and 274 are normally at the electrical centers of their respective resistors 262 and 270. When in such position the wipers 260 and 274 are at the same potential. Wiper 274 may be manually adjusted at will. If wiper 260 be made to follow the position of wiper 274, in order that no potential difference exist between the wipers 274 and 260, such movement of wiper 260 is also applied to the elevators not shown. Wiper 274 and resistor 270 are therefore designated the centering means for the elevators.

The various elements are shown in the drawing in the position they assume when the plane is flying in the direction in which it is desired to fly and is also headed in that direction. This is the condition which is desired to maintain. Under these conditions, the series of networks connected to each of the amplifiers 16, 116 and 216 is balanced so that the servomotors 13, 113 and 213 remain deenergized. Thus, referring to the rudder control channel, it will be noted that sliders 14 and 39 are both at corresponding positions with respect to resistors 36 and 31 so that no voltage exists between these two sliders. Similarly, slider 49 is adjacent the center tap 42 so that no voltage exists between slider 49 and center tap 42. Similarly, the voltage across network 70 has a zero value. Considering now the aileron network, it will be observed that the bridges 130 and 170 are balanced and that the slider 158 of network 150 is adjacent the center tap 160 so that no voltage exists between slider 158 and 160. Thus, the various component networks of the series of networks controlling the aileron are all balanced so that no voltage is supplied to the input of amplifier 116. A similar condition exists in the elevator control channel. The bridge 261 is balanced and the slider 237 of network 230 is at the center tap 238 of resistor 231. In the network 250, the slider 244 is at the center tap 256 and is hence at the same potential as the left-hand terminal of secondary 254 to which lead 257 is connected. Thus, again, the various networks connected to amplifier 216 are all balanced so that no voltage is supplied to the amplifier 216.

*Operation*

Assume now that the plane is still flying in the direction in which it is desired to fly but that the heading of the aircraft is changed so that it is not headed or is not pointing in the direction in which it is moving. In view of the fact that the aircraft is headed in a different direction from that in which it is moving, the vane 80 of the aircraft will be rotated by the streamlining action of the relative air upon it. The movement applied to vane 80 by the relative air is transferred to wiper 78 of the rudder control network and the wiper 180 of the aileron control network. The directional gyro 182 responds to any change of heading of the aircraft with respect to the desired direction of heading which in this case is the direction in which the plane is moving. The directional gyro through its operative connection 183 therefore displaces wiper 176 in an amount proportional to the difference between the desired heading and the present heading. In the present case the displacement of wiper 176 by the directional gyro is in the same direction and is of the same amount as the movement applied to wiper 180 from vane 80. No difference of potential therefore exists between wipers 180 and 176 and no control signal is applied to amplifier 116 of the aileron control channel.

However, in the rudder channel, the displacement of wiper 78 with respect to center tap 77 of resistor 71 of network 70 causes a control signal to be set up which is applied to amplifier 16. The amplifier 16 as shown becomes operative to control the direction of rotation of servomotor 13 in such a direction as to move wiper 14 through follow-up connection 17. The movement given to wiper 14 is in such direction and continues until it has set up a difference of potential between wiper 14 and wiper 39 equal and opposite to the voltage existing between wiper 78 and center tap 77. At such time, the amplifier 16 no longer receives any voltage from the networks and ceases to cause operation of motor 13. The movement given to wiper 14 from servomotor 13 through follow-up means 17 is also applied through operative shaft 12 to cable drum 11. The cable drum 11 therefore positions rudder through cables 10. The airplane turns under the effect of the rudder and the turning action of the plane causes the rate gyro 54 to apply movement to wiper 49. The direction in which wiper 49 is moved by the rate gyro is such as to set up a voltage between wiper 49 and center tap 42 of such nature as to oppose the voltage between wiper 78 and center tap 77 as to cause the amplifier 16 to so control servomotor 13 as to move the rudder toward zero position. The rate gyro sets up a signal which opposes the signal derived from the movement of the vane. The value of the signal from the rate gyro depends upon the angular rate of turning of the aircraft. After a corrective rudder has been applied, and the airplane moves toward the desired direction of flight the vane signal decreases which results in a decrease in the amounts of the rudder. The angular rate of turn of the aircraft is dependent upon the amount of rudder, and since the value of the rudder becomes less as the plane moves toward the desired direction, the angular rate is at a maximum as the plane starts to correct for the yaw condition. Therefore as the aircraft initially turns under the rudder resulting from the vane signal the rate gyro signal is at a maximum. It opposes the value of the voltage set up by the vane wiper. The value of the rudder displacement therefore decreases quickly initially. As the aircraft continues to turn under the rudder and tends to head in the direction in which it is moving, the vane 80 moves its wiper 78 toward normal position. Since the value of the rate signal also decreases because the decreased rudder signal reduces the angular rate of turn the rate gyro moves its wiper 49 towards its normal position. The follow up wiper 14 will also be moved by the servomotor toward the normal position on resistor 36. As the vane operated wiper 78 under decreasing yaw moves toward the center position on resistor 71 the follow up wiper 14 also moves toward the center position on resistor 36. The follow up wiper 14 actually is moving in advance of the vane wiper due to the signal derived from the rate gyro. In other words after a corrective rudder has been applied and the turn is initiated, the signal of follow up wiper 14 has less value than the signal obtained from the vane due to the subtractive effect of the rate gyro on the position of the rudder. As the plane reaches the desired direction of heading, the vane signal is zero. The rate gyro signal will be zero if the craft be not turning at zero yaw and its wiper 49 will be at the electrical center of resistor 44 consequently the wiper 14 driven by the servomotor will be at the normal position on resistor 36 and the rudder will be centered. If at the time the vane signal was zero, the aircraft was continuing in a turn or had an angular rate of turn the signal from the rate gyro would effect operation of the rudder servo to apply opposite rudder, to check the tendency of the aircraft to move beyond the desired direction of motion. However, if the aircraft should swing beyond the desired direction of motion, the vane will set up an opposite signal and the rate gyro due to the fact that the aircraft is turning will set up a signal which supplements that of the vane signal instead of setting up a signal which opposes the vane signal in the initial part of the turn. This effect of the rate gyro is to check any tendency of the aircraft to swing beyond the desired direction of motion.

In the aileron channel the directional gyro signal and the vane signal decrease at the same rate so that no control signal is present in the aileron channel. The second operation will be considered when the gyro is headed in one direction but the aircraft is actually headed and moving in a direction different from this gyro direction. Under such condition, the directional gyro 182 will move its wiper 176. However, since the plane is moving in the direction in which it is headed, the plane will not be in yawed condition. The vane 80 therefore will not displace wiper 78 of the rudder control network or the wiper 180 of the aileron control network. The wiper 180 controlled by the vane and the wiper 176 as moved by the directional gyro 182 will have a difference of potential between them which will apply a control signal to the aileron amplifier 116. At this time wipers 176 and 180 have a relative displacement from the electrical centers of their resistors and a signal is set up in the aileron control network which is applied to amplifier 116. Such signal causes the operation of amplifier 116 to control servomotor 113. The servomotor 113 drives cable drum 111 and cables 110 to position the ailerons in such manner as to lower the wing of the aircraft on the side in which it is desired to turn in order to bring the direction of movement to an accord with the desired gyro heading of the aircraft. At this time if it is necessary to turn to the left to bring the direction of movement in line with the desired gyro heading the right aileron would be lowered and the left one would be raised to tilt the plane to the left.

Since the air below the wing is at somewhat higher pressure than the air above the wing, the down moving right aileron produces considerably more drag than the up moving left aileron. The greater drag on the right wing would tend to swing the plane to the right momentarily although it is tilted about the roll axis to the left. With the plane in such position due to the increased drag of the right wing the plane would be in a yawed condition. In effect the plane would be in a side slip to the left. However, the vane 80 responds to any side slipping action of the plane and moves wiper 78 to set up a control signal to apply the proper rudder to remove the side slip or yaw. The plane therefore flies in a banked but unyawed condition. The horizontal component of lift of the banked plane tends to bring the plane around so that its direction of movement aligns itself with the desired direction of heading.

When an airplane reaches a desired angle of bank to effect a turn, it is necessary to move the ailerons back toward normal position otherwise the plane will continue to bank still farther. In order that the desired angle of bank which the plane has attained due to the signal applied from impedance network 170 be not exceeded, an opposite control signal is derived to cause the restoration of the ailerons toward neutral position. Such control signal for restoring the ailerons is obtained from vertical gyro 161. The vertical gyro 161 responds to the movement of the plane about its roll axis which was initiated from a control signal from impedance network 170. The vertical gyro 161 through its operative connection 162 moves wiper 158 of impedance network 150 with respect to its center tap 160. The difference of potential between wiper 158 and center tap 160 arising out of the movement of wiper 158 is equal and opposite to the difference of potential rising out of the relative displacements of wipers 176 and 180 of impedance network 170. In the initial banking of the plane when the difference of potential between wipers 180 and 176 causes the operation of amplifier 116 and servomotor 113, the servomotor 113 through follow-up 117 positions wiper 114 to set up between wipers 114 and 139 a difference of potential equal and opposite to that existing between wipers 180 and 176. With such equal and opposite potentials the network is balanced and servomotor 113 is at rest. When the vertical gyro 161 displaces wiper 158 with respect to center tap 160 to set up a difference of potential equal and opposite to that between wipers 180 and 176, the amplifier 116 is energized to reverse the direction in which servomotor 113 originally was operated. This causes the servomotor 113 to move wiper 114 back to its center position so that no difference of potential between wipers 114 and 139 exists. The ailerons being driven from servomotor 113 are therefore in neutral position.

As the plane's direction of movement under the action of the horizontal component of lift of the banked plane approaches the desired heading the signal from the directional gyro decreases therefor and a smaller difference of potential exists between wipers 180 and 176 which is less than that between wiper 158 and center tap 160. A differential signal therefore is set up and applied to amplifier 116. This causes the servomotor 113 to apply opposite aileron to the aircraft from that initially applied. The servomotor therefore applies opposite aileron and also through its follow-up means 117 moves wiper 114 to balance the control network for the amplifier channel. The application of opposite aileron tends to decrease the angle at which the the plane is banked. The vertical gyro 161 responds to the decreased angle of bank and therefore moves its wiper 158 toward its center tap 160. At this time there is an excessive voltage signal. This excess signal is in such direction as to cause amplifier 116 to restore the ailerons to neutral position and wiper 114 to its center position. The action is continuous with decreasing signal in the directional gyro tending to apply opposite aileron which continues to move the plane toward level flight. The vertical gyro responds to this decreased banking angle and sets up a signal to restore ailerons to neutral position. The action is continuous so that as the plane's direction of movement assumes the desired direction of heading the individual networks of the control channel for the aileron are in balanced condition and the ailerons are in neutral position.

Since an aircraft in a turn tends to lose altitude it is desirable at this time to apply up elevator in order to maintain the original altitude of the aircraft. For this purpose when the plane is in bank position causing the gyro 161 to operate wiper 158 in the aileron channel the vertical gyro 161 also, through its operative connection 242, moves the wiper 244 of impedance network 250 in the elevator control channel. The movement given to wiper 244 from operative connection 242 is such as to apply up elevator irrespective of the direction in which the plane moves about the roll axis. The operation of the elevator network, amplifier 216, and servomotor 213 is the same as the other channels, and the up elevator derived from movement of wiper 244 anticipates any loss of elevation that the plane might undergo and maintains the plane at the desired altitude. As the plane assumes level flight the wiper 244 moves toward normal position reversing the movement of the elevators whereby the elevators are also restored to normal position and the elevator networks are in normal position.

Figure 2

The new principle of controlling an aircraft in flight by controlling the rudder from a yaw sensing device and the roll axis control surfaces by the coaction of the yaw sensing device and the directional gyro has been embodied in a modification illustrated in Figure 2. The apparatus of Figure 2 is adapted to control the flight of a tailless airplane, often referred to as the "Flying Wing." As is presently known, the "Flying Wing" has two sets of control surfaces. Both sets of control surfaces are mounted in the trailing edges of the left and right wings. The outboard control surface in each wing is termed the rudder and controls the movement of the "Flying Wing" about the turn axis. The inboard control surface in each wing comprises a set of control surfaces whose function is to control the movement of the aircraft about the roll axis and also about the pitch axis. For this purpose the control surfaces may be moved together in one direction to act as the conventional elevators. On other occasions, they may be made to move in opposite directions in the same manner as the conventional ailerons. The term elevons has been applied to the inboard control surfaces since they are in the nature of elevators and also ailerons. The rudder in each wing instead of moving about the vertical axis moves about a horizontal axis, and its purpose is to increase the drag of its wing when it is moved to open position and to decrease its drag when moved to closed position.

Referring to Figure 2, the rudder, not shown, in the right wing is operated by cables 424 extending from a cable drum 425. The cable drum 425 is driven from a servomotor 426. The servomotor 426 may be of the type disclosed in my application Ser. No. 447,989, mentioned above. The rudder in the left wing is operated by cables 410 extending from the cable drum 411. The cable drum 411 is driven by a servomotor 412 which is similar to servomotor 426. As disclosed in that prior application, each servomotor includes two operating solenoids. Servomotor 412 has an operating solenoid 413 connected at one end through leads 418, 438 to a switch terminal 439. The opposite end of solenoid 413 is connected through lead 420 to a switch contact 452. The other operating solenoid 414 of servomotor 412 has one end connected through leads 417, 434 to a switch terminal 436. The opposite end of solenoid 414 is connected through lead 419 to a switch contact 452. The servomotor 426 has an operating solenoid 431 connected through leads 435 and 438 to switch terminal 439. The opposite end of solenoid 431 is connected through lead 433 to switch contact 453. Operating solenoid 430 of servomotor 426 has one end connected through leads 432 and 434 to switch terminal 436. The opposite end of solenoid 430 is connected through lead 435 to a switch contact 459.

Switch terminals 436 and 439 are housed within an amplifier 440. Terminal 436 forms a portion of a switch whose arm may be actuated from an electromagnetic relay 444. The arm of the switch is of the spring loaded type. As shown, this arm has its mounting terminal connected to one side of a battery whose opposite end is connected to ground. Terminal 439 forms a portion of a switch whose arm may be operated by an electromagnetic relay 443. The switch arm is spring loaded. As shown, the switch arm is connected to one side of a battery, the opposite side of the battery being connected to ground. The amplifier 440 may be of the type disclosed in application Ser. No. 447,989 dated June 22, 1942. This amplifier 440 has a signal input terminal 442 and a ground terminal 441. The amplifier is supplied from a source of load current 500 which may be an inverter (not shown). As disclosed in the prior application, the operation of relay 443 or 444 depends upon the phase relationship between the input signal applied between terminals 442 and 441 and the supply voltage derived from source 500. For purposes of explanation, we may consider that relay 443 is operated when it is desired to yaw the aircraft to the left and relay 444 is operated when it is desired to yaw the aircraft to the right.

The control signal to amplifier 440 is derived from a balanceable network 480; the input terminals of the amplifier being connected on a circuit extending from input terminal 442, lead 471, impedance network 480, ground 474, and to the grounded terminal 441 of the amplifier. Impedance network 480 comprises a resistor 481 whose opposite ends are connected through respective resistors 482 and 483 to a secondary 484 of a transformer 485. The primary 490 of the transformer 485 is connected to a suitable source of alternating voltages 500. Since the apparatus of Figure 2 has several secondary windings which may have a common primary winding, the primary winding of the transformer is indicated in each instance by the reference character 490. A wiper 497 may be positioned over the surface of resistor 481. It may be seen that a potentiometer circuit is therefore formed from the left end of the secondary 484 through resistor 483, resistor 481, and resistor 482 to the opposite end of secondary 484. A parallel circuit extends from the left end of secondary 484 through lead 487, a resistor 488, lead 489, a resistor 491, and lead 492 to the opposite end of secondary 484. A wiper 493 may be positioned along the surface of resistor 488 and a wiper 494 may be positioned along the surface of resistor 491. A resistor 495 is connected between the wipers 493 and 494. The resistor 495 has a center tap 496.

The two parallel circuits connected to the ends of secondary 484 form a bridge arrangement. The output of this bridge is measured across center tap 496 and wiper 497. In normal position the wipers 493 and 494 are in their inward position, as shown, and wiper 497 is at the electrical center of its resistor 481. When thus positioned, the potential of wiper 497 is the same as that of the center tap 496. If wiper 497 be positioned to either side of the electrical center of resistor 481, a difference of potential between the center tap 496 and wiper 497 exists. Center tap 496 is connected through lead 471 to the input terminal 442. Wiper 497 is connected to ground 474. It is therefore apparent that any difference of potential existing between center tap 496 and wiper 497 is applied to amplifier 440.

Wiper 497 is positioned through an operative connection 498 by a vane 499. The vane 499 may be of the type disclosed in Patent 1,119,324, dated December 1, 1914. In that patent, the vane 1 may receive its motion from the movement of the air with respect to the heading of the aircraft. This vane may be adapted to affect the movement of operative connection 498.

The servomotors 412 and 426, which have their respective operating solenoids 413, 414 and 430, 431 controlled from relays 443 and 444, are also controlled through a series of relay contacts comprising a left outer pair 450, 451; a left inner set 452, 453, 454; a right inner set 455, 456, 460; and a right outer pair 458, 459. A lead 472 extends from inner contact 451 of the left outer pair to left contact 455 of the right inner set. A lead 473 extends from right contact 454 of the left inner set to inner contact 458 of the right outer pair. Contact 453, which is positioned between contacts 452 and 454, is connected to ground. Contact 456, which is positioned between contacts 455 and 460, is connected to ground. Contacts 450 and 451 constitute a limit switch. This limit switch is spring biased so that contacts 450, 451 engage each other, as shown. A depending portion of contact 450 may be engaged to separate the contacts. Contacts 452 and 453 are spring biased so as to contact one another, but as shown, a depending portion of contact 453 may be engaged to separate contacts 452 and 453 and to engage contacts 453 and 454. Similarly, middle contact 456 is spring biased to engage contact 460, but as shown contact 456 has a depending portion which may be engaged to separate contacts 456 and 460 and to engage contact 456 with contact 455. Contacts 458 and 459 constitute a limit switch. Contact 459 is normally spring biased to engage contact 458, as shown. Contact 459 has a depending portion which may be engaged to separate contacts 458 and 459. The depending portion of contact 450 and contact 453 are actuated by a member 461 to which wiper 493 is secured. The member 461 is driven through a follow up connection from cable drum 411 of servomotor 412. The depending portions of contacts 456 and 459 are operated by a member 462 to which wiper 494 is attached. The member 462 is operated through a follow up connection 464 from cable drum 425 of servomotor 426.

With the arrangement of the members 461 and 462 as shown, the rudder in each wing is at closed position. If relay 443 in amplifier 440 closes its switch indicating that a turn to the left is desired, a circuit is completed at one end for operating solenoid 413 through leads 436 and 418 from terminal 439 and for operating solenoid 431 through leads 438 and 435 from terminal 439. The circuit extending from the opposite end of solenoid 431, is open between contacts 456 and 460. However, the circuit from the opposite end of operating solenoid 413 is completed through lead 420, the left outer pair of contacts 450, 451 and left and middle contacts 455, 456 of the right inner set to ground. The servomotor 412 is thus controlled by its operating solenoid 413 and drives its rudder toward open position.

Suppose that the left rudder assumes a partially open position due to the operation of operating coil 413. At this time, member 461 has been moved slightly to the left through its operative connection 463 from cable drum 411. Contacts 452 and 453 of the left inner set will therefore be closed, but contacts 453 and 454 will be separated.

Assume at this time while the aircraft is moving about its turn axis under control of the rudder that it is desired to stop the aircraft from turning. Such elimination of turning may be effected by opening the right rudder to a greater extent than that of the rudder in the left wing. However, it is desirable that the plane fly at all times with as low resistance to flight as it is possible to obtain. The elimination of turning may also be obtained by decreasing the resistance on the left wing. At this time relay 444 which produces an effect opposite to that of previously operated relay 443 would be operated to straighten the plane out. Operation of relay 444 closes the circuits for operating solenoids 430 and 414 up to one end of the solenoids. Operating solenoid 430 tends to open the right rudder whereas solenoid 414, when operated, causes the closing of the left rudder. At this time the left rudder is, as stated, in a partially open position. The circuit through the opposite end of operating solenoid 430 extends from lead 435, contacts 459, 458, lead 473, to contact 454 where it is broken. The circuit from the opposite end of operating solenoid 414 extends through lead 419, contact 452, and, due to the fact that member 461 has been moved to the left, through contact 453 and to ground. The operating solenoid 414 is therefore energized to cause the closing of the left rudder permitting the plane to straighten out or to stop turning. As the left rudder moves toward closed position, the follow up connection 463 moves the member 461 to separate contacts 452 and 453, deenergizing solenoid 414, and thereby stops servomotor 412. A similar operation occurs when the right rudder is moved toward open position in that contacts 456, 460 are closed as member 462 moves to the right thereby partially closing the circuit through solenoid 431 to permit closing the right rudder when relay 443 is energized. If the aircraft is to change from a left turning action to a right turning action it is apparent from above that the left rudder closes before the right rudder opens.

It may be seen, therefore, that through the arrangement of the relay contacts described above, only one rudder may be placed in operated condition at one time and that due to this operation the drag on the wing is kept to a minimum.

It may be at times desirable to carry a rudder in a partially operated position. Such a condition might arise due to unsymmetrical power in the aircraft. An arrangement has been provided whereby the rudder may be continually maintained in a partially operated position. For this purpose, a wiper 501, having a lead 502 may be adjusted over the surface of resistor 483 to shunt any desired portion of the resistor. Similarly, a wiper 503 having a lead 504 may be positioned along resistor 482 to shunt any portion thereof. The wipers 501 and 503 are operated from a common shaft 505 which moves wipers 501 and 503 in opposite directions so that if the wiper 501 is moved to shunt a greater portion of resistor 483, the wiper 503 will be positioned to shunt a lesser portion of resistor 482. It has been stated that normally wiper 497 and center tap 496 are at the same potential with the wipers 501 and 503 in the position as shown. If wiper 501 be moved to shunt a greater portion of resistor 483, the potential of wiper 497 will more nearly approach the potential of the left end of secondary 484 than exists in the position shown. The potential of center tap 496 will not change by operation of wipers 501, 503. Therefore, a difference of potential between wiper 497 and center tap 496 exists which will cause the amplifier 440 to operate one of its relays, which in turn causes the servomotor to position the rudder in partially operated position. The operating servomotor will position its follow up member to alter the potential of the center tap 496 until it is equal to that of wiper 497. When the potential of center tap 496 and wiper 497 is the same, the amplifier 440 no longer operates and the rudder remains in the partially operated position. The extent to which the rudder is operated depends upon the amount of unbalance of the network.

The elevons, which are not shown, control the movement of the aircraft about the pitch and roll axes. The elevon in the right wing is operated from cables 700 extending from cable drum 709 driven by servomotor 701. Servomotor 701 is similar to servomotor 426. The servomotor 701 is controlled from an amplifier 704. The amplifier 704 is similar to amplifier 440. The elevon in the left wing is operated by cables 702 extending from a cable drum 723. Cable drum 723 is driven from servomotor 703. Servomotor 703 may be similar to servomotor 701. Servomotor 703 is controlled by an amplifier 726. The amplifier 726 may be similar to the amplifier 704. The amplifiers 704 and 726 may be operated to so control their servomotors as to effect the movement of the elevons in either the same direction to give elevator action or in opposite directions to produce aileron action. The amplifier 704 has an input terminal 705 and a ground terminal 706. Its supply leads are connected to source 500. Amplifier 704 is controlled by a plurality of networks 710, 730 and 760. To effect the operation of amplifier 704 so as to produce elevator operation of the right elevon, a signal may be applied to amplifier 704 through a circuit extending from lead 705, impedance network 710, leads 720 and 720a, the right hand portion of a resistor 721, lead 724, impedance network 730, ground 740, and to the grounded terminal 706 of amplifier 704. The amplifier 726 has an input terminal 707 and a ground terminal 708. The power terminals of amplifier 726 are connected to supply 500. Amplifier 726 is controlled by network 730 and two further networks 740 and 770. A signal for operating amplifier 726 to effect the operation of the left elevon as an elevator is derived from a circuit extending from input 707, impedance network 770, leads 780 and 780a, the left-hand portion of resistor 721, lead 724, impedance network 730, to ground 740, and to the grounded terminal 708 of amplifier 726.

The impedance network 710 in the input circuit of amplifier 704 is in the form of a Wheatstone bridge. Two legs of this bridge are formed by a resistor 711 having its opposite ends connected through leads 712 and 713 to the respective ends of a secondary 714 of a transformer 715. The transformer 715 has a primary 490. A manually operable wiper 716 may be positioned over the surface of resistor 711. The other two legs of the bridge are formed by a resistor 718 which has its opposite ends connected to the respective ends of secondary 714 through leads 712 and 713. A wiper 719 may be positioned over the surface of resistor 718. The wiper 719 may be moved through a follow up connection 717 extending to cable drum 709. The wiper 719 is connected to lead 705 which is the input to amplifier 704.

In normal position the wipers 716 and 719 are at the electrical centers of their respective resistors 711 and 718. When in such position the wipers 716 and 719 are at the same potential. If wiper 716 be manually moved from its electrical center, its potential with respect to wiper 719 will be altered. In order that the wipers 716 and 719 may be at the same potential, it will be necessary, therefor, for servomotor 701 to adjust wiper 719 accordingly. Since wiper 719 can only be moved with a concurrent movement to the right elevon, it may be seen that wiper 716 may be adjusted to alter the position of the right elevon in order that no potential difference exists between wipers 716 and 719. Wiper 716 and its resistor 711 are termed the centering means of the right elevon since they are used to adjust its position until it normally reaches center position.

Wiper 716 is connected through a lead 720 to one end of the resistor 721. Resistor 721 has a center tap 722 which is connected through the lead 724 to a wiper 738 of the impedance network 730. Impedance network 730 is in the form of a Wheatstone bridge. To legs of this bridge are formed by a resistor 731 having its opposite ends connected through leads 732 and 733 to the respective ends of a secondary 734 of a transformer 735. The transformer 735 has a primary winding 490. A manually adjustable wiper 736 may be positioned along the surface of resistor 731. The wiper 736 is connected to ground 740. The other two legs of the bridge are formed by a resistor 737 whose opposite ends are connected through leads 732 and 733 to the respective ends of secondary 734. A wiper 738 may be positioned over the surface of resistor 737. The wiper 738 receives its movement from an operative connection 739 extending from a vertical gyro 725. The vertical gyro 725 may be of the type disclosed in my application previously referred to, Ser No. 447,989. Movement of the aircraft about its pitch axis causes the vertical gyro 725 to apply motion to the operative connection 739 and to wiper 738.

The impedance network 770 which forms a portion of the input circuit to amplifier 726 is in the form of a Wheatstone bridge. Two legs of this bridge are formed by a resistor 771 whose opposite ends are connected through leads 772 and 773 to the respective ends of secondary 774 of a transformer 775. The transformer 775 has a primary winding 490. The resistor 771 has a wiper 776 which may be manually moved over its surface. Wiper 776 is connected through a lead 780 to one end of resistor 721.

The other two legs of the bridge are formed by a resistor 777 whose opposite ends are connected through leads 772 and 773 to the respective ends of secondary winding 774. A wiper 778 may be positioned over the surface of resistor 777. The wiper 778 receives its motion through a follow up connection 779 from cable drum 723. Wiper 778 is connected to the input 707 of amplifier 726. Wiper 776 and its resistor 771 constitute a centering means for the left elevon since impedance networks 770 and 710 are similarly related to their amplifiers and servomotors.

In addition to the means for centering the elevons individually, means is also provided to move them in the same direction simultaneously. Such means is provided in order that if desired a slight amount of up elevon may be carried in each wing or if necessary a slight amount of down elevon may be carried. Such means for concomitantly adjusting both elevons is included in the impedance network 730 which is common to the input circuits of amplifiers 704, 726. In normal position, the wipers 778 and 766 of network 770 are at the electrical centers of their respective resistors 777 and 771. Similarly, wipers 719 and 716 of network 710 are at the electrical centers of their respective resistors 718 and 711. Wipers 738 and 736 of network 730 are also at the electrical centers of their respective resistors 737 and 731. Wipers 736 and 738 are now at the same potential. If wiper 736 be moved with respect to its electrical center, a difference of potential exists between wipers 736 and 738. Wiper 736 is connected to a common ground 740 for amplifiers 704 and 726. Wiper 738, on the other hand, is connected to amplifier 704 through lead 720, impedance network 710, and input lead 705. Similarly, wiper 738 is connected through lead 780, and impedance network 770, to input lead 707 of amplifier 726. Wipers 738, 776, 778 on the one hand and wipers 739, 716 and 719 on the other hand are at the same potential. The difference of potential which at this time exists between wiper 736 and wiper 738 will therefore exist between input terminal 705 of amplifier 704 and the grounded terminal 706 of amplifier 704. This same difference of potential will also exist between input terminal 707 of amplifier 726 and grounded terminal 708 of amplifier 726. The amplifiers 704 and 726 will therefore control their respective servomotors 701 and 703 to move their elevons in the same direction. The movement of the servomotors to position the elevons will also operate through follow up means 717 and 779 to set up equal and opposing voltages to that existing between wipers 736 and 738. When such voltage is set up by the follow up means on their respective impedance networks 710 and 770, the amplifiers 704 and 726 no longer operate. The elevons have thus been moved to a position which has been determined by the movement of the manually operable wiper 736. The amount of adjustment given to wiper 736 may be varied with conditions. The above description relates to the operation of the elevons as elevators, in which operation both elevons were moved together in the same direction.

A network has been devised for obtaining the operation of the elevons as ailerons. The elevons when operated as ailerons may be said to be differentially moved. Such differential movement of the elevons may be secured by applying voltage of one phase to one amplifier and by applying a voltage of the opposite phase concomitantly to the opposite or the other amplifier. The differential effect may be said to be secured by this differential signal. The differential signal is derived from voltage drops along the resistor 721 which has its opposite ends connected to leads 780a, 720a of the input circuits of amplifiers 704, 726. As previously explained, resistor 721 has a center tap 722 which is connected through impedance network 730 to ground 740. Consequently, in normal position, as shown, the center tap 722 is at the same potential as ground 706 of amplifier 704 and ground 708 of amplifier 726. If current passes through resistor 721 during a given half cycle from the left end toward the right end, the left end of resistor 721 is at a higher potential than the right end during that half cycle. The left end of resistor 721 is connected through lead 780 and impedance network 770 to input terminal 707 of amplifier 726. The right end of resistor 721 is connected through lead 720 through network 710 to input 705 of amplifier 704. The left end of resistor 721 has as great a potential above that of center tap 722 as the right end of resistor 721 is below the potential of center tap 722. In other words, the potentials of the left and right end of resistor 721 with respect to the center tap are equal but of opposite phase. The opposite phase of the potentials may be termed a differential signal. The potential at the left end of resistor 721 is therefore applied to amplifier 726 and an equal but opposite potential is applied to input 705 of amplifier 704. These signals cause the operation of amplifiers 704 and 726. The amplifiers, when operated, cause their servomotors 701 and 703 to move their respective elevons in opposite directions. This opposite movement of the elevons is similar to the movement applied to the conventional ailerons.

The current through resistor 721 is derived from a series of connected networks 740 and 760 through a circuit extending from the left end of resistor 721, impedance network 740, lead 770, and impedance network 760 to the right end of resistor 721.

The impedance network 740 is in the form of a Wheatstone bridge. Two legs of this bridge are formed by a resistor 741 whose opposite ends are connected through leads 742 and 743 to the respective ends of a secondary winding 744 of a transformer 745. The transformer 745 has a primary winding 490. A wiper 746 may be moved over the surface of resistor 741. The wiper 746 is moved from vane 499 through an operative connection 747. The opposite two legs of the bridge are formed by a resistor 748 whose opposite ends are connected through leads 742 and 743 to the respective ends of secondary winding 744. The wiper 749 may be moved over the surface of resistor 748. The wiper 749 receives its motion through an operative connection 751 from a directional gyro 750. Directional gyro 750 may be of the type disclosed in my application Ser. No. 447,989, referred to above. In normal position, wipers 746 and 749 are at the electrical centers of their respective resistors 741 and 748. In such position wipers 746 and 749 are at the same potential. Wiper 749 is connected through lead 780a to the left end of resistor 721. The wiper 746 is connected through lead 770 to wiper 768 of an impedance network 760.

Impedance network 760 is in the form of a Wheatstone bridge. Two legs of this bridge are formed by a resistor 761 whose opposite ends are connected through leads 762 and 763 to the opposite ends of a secondary winding 764 of a transformer 765. The transformer 765 has a primary winding 490. A wiper 766 may be manually moved over the surface of resistor 761. A connection 720a extends from wiper 766 to the right end of resistor 721. The other two legs of the bridge are formed by a resistor 767 whose opposite ends are connected through leads 762 and 763 to the respective ends of secondary winding 764. The wiper 768 which may be adjusted over the surface of resistor 767 derives its motion through a mechanical connection 769 from vertical gyro 725. Movement of the aircraft about its roll axis causes the vertical gyro to apply movement to the operative connection 769 and thereby position wiper 768.

In normal position as previously stated, the wipers 746 and 749 of impedance network 740 are at the electrical centers of their respective resistors 741 and 748. When so positioned, the wipers 746 and 749 are at the same potential. Similarly, in normal position, wipers 766 and 768 are at the electrical centers of their respective resistors 761 and 767. In normal position, wipers 766 and 768 are at the same potential. If wiper 766 is manually adjusted with respect to its electrical center a potential difference exists between wipers 766 and 768. Wipers 768 and 746 are at the same potential, and wiper 766 is therefore also at the potential of wiper 749. A difference of potential therefore exists between wiper 766 and wiper 749. This difference of potential causes a current to pass through resistor 721. The potential at center tap 722 is the mean of the potential between wipers 766 and 749. Center tap 722 is connected through network 730 to ground. The potential on 749 is applied to amplifier 726 through network 770. The potential of wiper 766 is applied through network 719 to amplifier 704. The potentials applied to amplifiers 704 and 726 with respect to the center tap 722 are of equal but opposite phase. A differential signal is thereby applied to each amplifier causing the amplifiers 704 and 726 to effect the operation of their servomotors 701 and 703 in opposite directions. The operation of the servo-motors causes opposite movements of the elevons. The servomotors in turn operate their follow up connections 717 and 779 to set up a voltage on networks 719 and 779 equal and opposite to that existing between their amplifier inputs and center tap 722 which is the same as ground potential. The wiper 766 may therefore be manually operated to alter in reverse direction the position of the ailerons.

Reverting to the vane 80, it is proposed to provide the vane with damping means whereby the vane will not respond to temporary or local gusts of air but will respond to prolonged yaw conditions. In Figure 3, the vane 80 is supported on a shaft 800. The shaft 800 extends vertically through a part of the aircraft's frame 802, and a collar 801 on shaft 800 may rest on the frame and serve to rotatably support the shaft. The shaft 800 which drives the wipers 78, 180, Figure 1, at its lower end has affixed thereto a yoke 804. The ends of the yoke 804 are journaled to receive trunnions 805, 806 of a carden ring 808. The carden ring 808 in turn is journaled to receive the axle 810 of a rotor 809. The rotor 809 may be rotated by any conventional means, such as an electric motor or by air operated means, not shown. Centering springs 811 and 812 extend from the cardan ring 808 on opposite sides of trunnion 805 to a common point on the yoke 804.

When local air gusts strike the vane 80, the rotation of shaft 800 is resisted by the rotor 809 which precesses about the axis of trunnions 805 and 806. This rotation about the axis of trunnions 805, 806 is resisted by either centering springs 811 and 812 depending upon the direction of rotation about said axis. By such operation, the torque applied to the vane 80 due to local gusts is absorbed by the action of the rotor 809 in rotating about the axis of trunnions 805, 806.

When the torque applied to the vane 80 is prolonged in nature, the rotor 809 will precess about the axis of trunnions 805, 806 until such time as the tension on either spring 811 or 812 supplies a torque equal to that tending to precess the gyro rotor 809. At this time the rotor 809 will have reached its maximum amount of precession. The vane 80 will now under the effect of the torque applied by the prolonged condition of yaw tend to rotate shaft 800 and to position wipers 78 and 180 of Figure 1. The vane 80 will therefore respond only to prolonged conditions of yaw and will not oscillate due to local gusts which are encountered by the aircraft.

*Operation*

The operation of the apparatus in Figure 2 will be considered when the plane is in such condition that it is moving in the desired direction, but it is not headed in this direction. Under such conditions, the magnitudes in network 749 of the deviation signal from the directional gyro and the vane signal are the same. The operation of the vane 499 positions its wiper 746. At the same time, the directional gyro 750 positions its wiper 749 in the same direction. The wipers 746 and 749 therefore have no potential difference between them although they have been moved with respect to the electrical centers of their respective resistors, and since sliders 763 and 766 of network 768 are both in their center positions, no current will therefore flow through resistor 721. No signal will at this time be applied to amplifiers 704 and 726 to differentially adjust the elevons.

However, the movement of vane 499 through its operative connection 498 displaces wiper 497 of the rudder networks with respect to the electrical center of resistor 481. Suppose wiper 497 is moved toward the right of the center of resistor 481. Consider in a given half cycle the right end of secondary 484 is negative with respect to the left end. Wiper 497 is electrically nearer the right end than center tap 496. A difference of potential therefore exists between wiper 497 and center tap 496. Such difference of potential causes the amplifier 440 to become operative to close electromagnetic relay 444. The operation of the relay 444 in turn closes a circuit through servomotor operating solenoid 430 causing the servomotor to drive its rudder toward open position. The servomotor drives its follow up to position a member 494 to the right to make the potential of center tap 496 the same as that of wiper 497. When the potentials are equal the relay 444 is deenergized. The plane responds to the effect of the rudder and begins to move in a turn so that it tends to head in the direction in which the plane is moving.

Such a change of heading of the aircraft changes the amount of the signal from vane 499 since the vane is positioned in accordance with the direction of the relative air. Since the vane signal decreases, the wiper 497 is moved leftward toward the electrical center of its resistor 481. The repositioning of wiper 497 leaves an unbalance voltage in network 480 due to the position assumed by the member 494 driven by the follow up from the operated servomotor. The amplifier therefore calls for reverse rotation of the servomotor. The servomotor responds to the reverse signal and moves the right rudder toward closed position and again operates its follow up to set up an equal potential on center tap 496 as that which is present on wiper 497. The action is continuous; the vane responds to the decrease in the yaw angle and continues to move its wiper 497 toward the electrical center of resistor 481 and the amplifier causes the servomotor to drive the rudder further toward closed position and to balance network 480. At the time that the plane is headed in the desired direction of movement, the vane is in its normal position, the network 480 is balanced, and the rudder is in closed position. Since the vane signal and the deviation signal in the network 749 decrease at the same rate as yaw is removed, they have no differential movement and no operation of the elevons takes place.

The operation will now be considered when the plane is headed and moving in one direction but is not moving in the desired direction indicated by the directional gyro. At this time, the directional gyro 750 will move its wiper 749 since the plane is not headed in the desired direction. The vane 499 responds to the relative air and since there is no yaw it does not move its wiper 746 in the elevon control. When the directional gyro 750 has moved its wiper 749 at this time in accordance with the deviation signal, wiper 746 is at the electrical center of resistor 741. Wipers 746 and 749 have a difference of potential which is now applied across resistor 721. This signal as applied across resistor 721 sets up a differential signal in the amplifiers 704 and 726 which effects aileron operation of the elevons. The positioning of the elevons also causes the operation of the follow up mechanisms 717 and 779 which set up a signal equal but opposed to the initiating signal.

It is apparent that the magnitude of the bank is proportional to the magnitude of the deviation between the gyro indication of the craft and its direction of movement which at this time is the same as its heading. While it is desirable that the bank of the plane be proportional to the magnitude of the deviation, the bank of the plane should not be of greater magnitude than the bank resulting from the deviation signal. When a plane is placed in a banked position, it is necessary to decrease the amount of aileron if a desired bank is to be maintained; it will continue in this banked position even though the aileron or elevons are returned to central position. The magnitude of the bank which is proportional to the deviation signal is therefore maintained through the operation of the vertical gyro 725. The vertical gyro 725 responds to the movement of the plane into the banked position and moves its operative connection 769 to adjust wiper 768 with respect to the electric center of resistor 767. The signal between wipers 768 and 769 resulting from the movement of wiper 768 by the vertical gyro 725 sets up a signal on amplifiers 704 and 726 which is opposite to the signal arising out of the difference of potential between wipers 746 and 749. The amplifiers 704 and 726 are thereby operated to cause the servomotors 701 and 703 to drive the elevons toward center position. The plane is now in an angle of bank which it maintains and which it does not exceed. The banked plane now turns so that its direction of movement assumes the desired gyro indicated direction. As the plane's direction of movement which is the direction of heading now approaches the desired gyro direction of movement, the signal from directional gyro 750 decreases. The wiper 749 is therefore moved toward the electrical center of wiper 746. The difference of potential between wiper 749 and wiper 746 is opposed to the difference of potential between wipers 768 and 766. These voltages are in opposition; and there being a difference of voltage, a voltage drop exists across resistor 721. This voltage drop is in the opposite direction from that originally resulting from the initial displacement of wiper 749 from the directional gyro. The amplifiers 704 and 726 respond to this opposite differential signal and apply opposite aileron. The follow up members 717 and 779 again set up equal and opposing signals. The craft responds to the opposite aileron and decreases its angle of bank. In view of the decreased angle of bank, the vertical gyro 725 reverses the motion applied to its operative connection 769 and moves wiper 768 toward the electrical center of resistor 767. The signal resulting from the motion of the vertical gyro 725 causes the servomotors to restore their ailerons toward central position. The action is continuous; the directional gyro signal continues to decrease to effect the application of opposite aileron and the vertical gyro responds to the decreased bank and tends to restore the elevons to center position. At the time the plane's heading and direction of movement coincide with the desired gyro heading, the wiper 749 is at the electrical center of resistor 748 and the wiper 768 is at the electrical center of resistor 767. During this turning movement of the plane, the vane functions to cause the operation of the rudder to remove any yaw which the plane may have while in such turn. The networks are ultimately individually balanced, and the elevons are in center position.

The vertical gyro 725 also functions to stabilize the craft about its roll axis. If the plane be headed in the desired direction and be moving in the desired direction, the plane may, due to external causes, assume a banked position. The plane is automatically brought back to level position by the operation of vertical gyro 725. The gyro responds to movement of the plane about its roll axis and adjusts wiper 768. The movement of wiper 768 sets up a difference of potential between wiper 768 and wiper 766. This difference of potential results in current flowing through resistor 721. The current through the resistor 721 affects the differential action of the elevons from their respective servomotors. The servomotors also operate their follow ups 717 and 779 to set up equal but opposing voltages. The plane responds to the operated elevons and moves toward level flight. As the plane moves toward level flight, the vertical gyro 725 responds to this smaller angle of bank. The gyro 725 consequently moves wiper 768 toward the electrical center of resistor 767. A reverse signal is therefore set up in the amplifiers 704 and 726 which causes them to move their elevons toward normal position. The action is continuous.

The plane is also stabilized with respect to movement thereof about the pitch axis. Such stabilization is effected through impedance network 730 which is controlled through an operative connection 739 from the gyro vertical 725. The vertical gyro 725 responds to movement of the plane about its pitch axis and causes the operative connection 739 to displace wiper 738 with respect to the electrical center of resistor 737. Since wiper 736 is at the electrical center of its resistor 731, a potential difference exists between the displaced wiper 738 and wiper 736. Wiper 736 is connected to ground 740 and to the grounded terminals 706 and 796 of amplifiers 704 and 726. The potential of wiper 738 is applied through lead 729, impedance network 718, through input lead 705 to amplifier 704 on the one hand and through lead 780, network 770 to input terminal 707 of amplifier 726 on the other hand. The amplifiers 704 and 726 therefore receive a voltage of like phase with respect to their ground connections. The amplifiers 704 and 726 effect the operation of their servomotors 701 and 703. The servomotors operate their respective elevons in the same direction. Servomotor 701 drives follow up 717 to position wiper 719 to set up between wiper 719 and wiper 716 a voltage equal but opposed to that existing between wiper 738 and wiper 736. Similarly, servomotor 703 through follow up 779 positions wiper 778 to set up a voltage between wiper 778 and wiper 776 equal but opposed to the voltage between wiper 738 and 736. At this time the networks are balanced and no signal is applied to amplifiers 704 and 726. Their respective servomotors therefore stop operating and the elevons which have been driven in the same direction remain in operated position. The plane responds to the operated elevons and moves toward level position.

As the plane moves toward level position the vertical gyro 725 responding to the lesser angle about the pitch axis moves its wiper 738 toward the electrical center of resistor 737. A smaller difference of potential therefore exists between wipers 738 and 736 than existed initially. This potential between wipers 738 and 736 is at this time less than the potential between wipers 719 and 716 on the one hand and wipers 778 and 776 on the other hand. This unbalance voltage causes the amplifiers 704 and 726 to operate. The amplifiers 704 and 726 cause their servomotors 701 and 703 to move in an opposite direction from that initially given to them. The control surfaces are therefore moved toward center position. The action is continuous, being of such character that as the plane reaches level position the vertical gyro has moved its wiper 738 to the electrical center of resistor 737 and the servomotors 704 and 726 have moved their follow up wipers 719 and 778 to the electrical centers of resistors 718 and 777. At this time the individual networks are in balanced condition and the elevons are in normal position.

It is now apparent that we have embodied in apparatus a novel principle of automatically controlling an aircraft in flight. The embodiments described eliminate unnecessary operation of the ailerons of the aircraft by only operating the rudder when it is desired merely to streamline the craft or to cause the aircraft to head in a desired direction of movement. The function of turning the craft to change the direction of movement as distinguished from change in heading is effected by operation of the ailerons. This elimination of the unnecessary operation of the ailerons dispenses with unnecessary banking of the plane.

It is also evident that we have devised apparatus which includes a novel circuit arrangement for the control of the elevons in their function both as ailerons and also as elevators.

I claim:

1. Flight control apparatus for an aircraft having two control surfaces, said apparatus comprising: control means responsive to the change of heading of said aircraft with respect to the direction of movement of said aircraft, control means responsive to the change of heading of said aircraft, operating means for said control surfaces, means including both said control means for controlling one operating means, and means including said change of heading responsive means for controlling another operating means.

2. Flight control apparatus for an aircraft having two control surfaces, said apparatus comprising: control means responsive to the change of heading of said aircraft with respect to the direction of movement of said aircraft, control means responsive to the change of heading of said aircraft, operating means for said control surfaces, means including both of said control means for controlling one operating means, and means including said change of heading responsive means for controlling another operating means, said control means effecting concurrent operation of said operating means.

3. A flight control apparatus for an aircraft having one control surface for controlling the movement of said aircraft about one axis, another control surface for controlling the movement of said aircraft about an axis perpendicular to said first axis, said apparatus comprising: a first control means responsive to the change of heading of said aircraft with respect to the direction of movement, a second control means responsive to the change of heading of said aircraft, operating means for said control surfaces, means including said first and second control means for controlling one operating means, and means including said first control means for controlling another operating means.

4. A flight control apparatus for an aircraft having two control surfaces, said apparatus comprising: a first control means responsive to the difference between the heading of said aircraft and the direction of movement of said aircraft, a second control means responsive to the change of heading of said aircraft, a third control means responsive to the movement of said aircraft about an axis, operating means for said control surfaces, means including said first and second control means for controlling the operating means for said first control surface, and means including the third control means for controlling the operating means for the second control surface.

5. A flight control apparatus for an aircraft having three control surfaces, said apparatus comprising: a first control means responsive to the difference between the heading of said aircraft and the direction of movement of said aircraft, a second control means responsive to the change of heading of said aircraft, a third control means responsive to the movement of said aircraft about an axis perpendicular to the direction of movement, operating means for said control surfaces, means including the first control means for controlling the operating means for the first control surface, means including said first and second control means for controlling the operating means for the second control surface, and means including the third control means for controlling the operating means for the third control surface.

6. A flight control apparatus for an aircraft having three control surfaces, each control surface controlling the movement of the aircraft about one of three respectively perpendicular axes, said apparatus comprising: a first control means responsive to the difference between the heading of said aircraft and the direction of movement of said aircraft, a second control means responsive to the change of heading of said aircraft, a third control means responsive to the movement of said aircraft about an axis perpendicular to the direction of movement of said aircraft, operating means for said control surfaces, means associating the first control means with the operating means of the first control surface, means associating said first and second control means with the operating means for the second control surface, and means including said third control means for controlling operating means for the third control surface.

7. A flight control apparatus for an aircraft having three control surfaces, each controlling the movement of the aircraft about one of three respectively perpendicular axes, said apparatus comprising: a first control means responsive to the difference between the heading of said aircraft and the relative direction of movement of the aircraft and air, a second control means responsive to the change of heading of said aircraft, a third control means responsive to the movement of said aircraft about an axis which movement is perpendicular to the direction of heading of said aircraft, operating means for said control surfaces, means including the first control means for controlling the operating means of the first control surface, means associating said first and second control means with the operating means of the second control surface to cause said aircraft to move about the axis which movement is perpendicular to the direction of heading of said aircraft, and means including said third control means for controlling the operating means for the third control surface.

8. Motor control means comprising, an impedance network having an adjustable element, a connection from said element to one end of an impedance element, a connection from the other end of the impedance element to said network, a motor, a motor controller, a connection from one end of the impedance element to said motor controller, a second motor, a second motor controller, a connection from the other end of the impedance element to said second controller, and a connection from both controllers to a center tap of said impedance element whereby adjustment of said element effects a potential drop across said impedance element and causes the operation of said motors.

9. Motor control means comprising, two bridge networks having an output member of one network connected to one of the output members of a second network, a center-tapped resistor connected across the two remaining output members of the two networks, a third bridge network having an output portion connected to the center-tap, a first motor means including a controller, a connection from the controller to one remaining member, a second motor means including a controller, a connection from the second motor means controller to the other remaining member and a connection from the other output portion of the third bridge to said motor means controllers all whereby a signal derived from a difference in potential across a pair of bridge outputs members in the first or second networks causes one type of operation of said motor means and a signal derived from a difference of potential across the output portions of said third bridge causes another type of operation of said motor means.

10. Flight control apparatus for an aircraft having two control surfaces, said apparatus comprising: separate motor means for operating each control surface, control means for each motor means, a plurality of impedance networks having adjustable members and each network having output elements connected in series leaving two remaining elements constituting the output sides of the series, an impedance element connected across the output sides of said series networks and having a center tap, a connection from one end of said impedance element to each control means, and a connection from the centertap of said impedance element to each control means, whereby a signal derived from the movement of a member in one impedance network causes operation of said motor means in opposite directions to move said control surfaces in opposite directions.

11. Flight control apparatus for an aircraft having two control surfaces, said apparatus comprising: separate motor means for operating each control surface, control means for each motor means, a plurality of impedance networks having adjustable members each network having output elements connected in series and leaving two remaining elements constituting the output sides of the entire series, an impedance element connected across the output sides of said series networks including a center tap, means responsive to the movement of the aircraft about its roll axis for adjusting a member of one impedance network, means responsive to the difference in heading of the aircraft with respect to its direction of movement for moving a member of a second impedance network, a connection from one end of said impedance element to each control means, and a connection from the center tap of said impedance element to each control means, whereby a signal derived from the movement of either member of said impedance networks causes operation of said motor means in opposite directions to move said control surfaces in opposite directions.

12. Flight control apparatus for an aircraft having two control surfaces, said apparatus comprising: operating means for said control surfaces, control means associated with said operating means, a plurality of impedance networks each network having two output terminals, connections from one network terminal to another network terminal leaving two free terminals whereby the networks are electrically connected in series, each said impedance network having an adjustable element, a center tapped resistor connected across the free terminals of the series connected impedance networks, a connection from one end of the resistor to one control means and a connection from the opposite end of the resistor to the other control means, an additional impedance network, a connection from said additional impedance network to the center tap of the resistor, a connection from a movable element of said additional network to each said control means, means responsive to the difference between the heading of the aircraft and the direction of movement of the aircraft to adjust one impedance element, means responsive to the movement of the aircraft about one axis to move the element of another impedance network, and means responsive to the movement of the aircraft about another axis for controlling the movable element of the additional impedance network, whereby movement of the elements through the change of heading device or the movement of the aircraft about one axis causes the operation of the control surfaces in opposite directions and on the other hand movement of the additional network element due to movement of the aircraft about another axis causes both control surfaces to be moved together in the same direction.

13. In an automatic flight control system for an aircraft having two control surfaces which control the movement of the aircraft about the same axis; an operating means for each said control surface; a control means for each said operating means each control means including a condition responsive means, a follow up means driven by said operating means, and an individual manual means for each control means, each control means being effective to cause the operation of its operating means; said follow up means rendering said manual means and said condition responsive means ineffective with respect to said operating means pending their further operation.

14. Control apparatus for an aircraft having control surfaces for positioning said craft about the roll axis and a control surface for positioning said craft about the vertical axis, said apparatus comprising: a vane pivotally supported on said craft whereby it may align itself with the direction of the air relative to said craft; position maintaining means responsive to change in position of said craft about said vertical axis; motor means for operating said roll axis surfaces; motor means for operating said vertical axis surface; combining means controlled by said vane and said position maintaining means for operating said roll axis surface motor means in accordance with the differential movement of said vane and position maintaining means; and means controlled by said vane for operating the vertical axis motor means in accordance with the movement of said vane.

15. Flight control apparatus for aligning the flight path of an aircraft with a heading to be maintained, said aircraft having aileron control surfaces and a rudder control surface, said apparatus comprising: a vane pivotally mounted on said craft and responsive to the side slip angle of said craft whereby it aligns itself with the direction relative to said craft heading; position maintaining means for detecting changes in heading of said aircraft; a variable signal providing control device operated by said vane in a sense and magnitude proportional to pivotal movements of the vane relative to said craft; a variable signal providing control device operated by said position maintaining means in a sense and magnitude proportional to changes in heading detected by said position maintaining means; motor means adapted to operate said aileron control surfaces; motor means adapted to operate said rudder control surface; means for combining the signals from said two control devices and connected to said aileron motor means for effecting operation of said aileron motor means upon differential operation of said two control devices; means for operating said rudder motor means from said vane operated signal providing control device, whereby if said heading signal device and side slip signal device operations are equal and of the same sense the rudder only will be operated to align the craft heading with the direction of the air relative to said craft and whereby for a differential operation of the two control devices by the vane and position maintaining means to produce a differential error said ailerons are additionally operated to bank said craft to align said flight path with said heading to be maintained to remove the differential error.

16. In a flight control apparatus for an aircraft having aileron control surfaces for banking the craft to change direction of craft flight, in combination: a first signal providing control means; relative wind responsive means connected to said signal providing means and responsive to the angular direction of the craft with respect to the relative wind to adjust said signal providing means in accordance with said angular direction to provide a signal variable in sense and proportional to the magnitude of said angular direction; a second signal providing control means including a direction maintaining device responsive to and proportionally adjusted in accordance with the angle between the heading of said craft and the direction of said device for providing a second signal variable in sense and proportional to the magnitude of the angular heading deviation of said craft from the direction of said direction maintaining device; operating means for said aileron control surfaces; means including algebraic signal combining means connected to said first and second control means and to said operating means for controlling said operating means to effect operation of said ailerons to change the heading direction of the craft whenever said signals are not equal and opposite in sense; and means connected to and controlled by said relative wind responsive means for changing the heading of the craft in a direction tending to cause said craft to head in the direction of the relative wind.

WILLIS H. GILLE.

References Cited in the file of this patent
UNITED STATES PATENTS

| Number | Name | Date |
|---|---|---|
| 1,351,538 | Reynolds | Aug. 31, 1920 |
| 1,777,282 | Constantin | Oct. 7, 1930 |
| 1,832,334 | Tarbox | Nov. 17, 1931 |
| 1,889,273 | Avery | Nov. 29, 1932 |
| 2,159,142 | Fischer | May 23, 1939 |
| 2,201,174 | Harding et al. | May 21, 1940 |
| 2,323,151 | Meredith | June 29, 1943 |
| 2,343,288 | Fink | Mar. 7, 1944 |
| 2,387,795 | Isserstedt | Oct. 30, 1945 |
| 2,417,821 | Harcum et al. | Mar. 25, 1947 |
| 2,420,932 | Cornelius | May 20, 1947 |
| 2,464,629 | Young | Mar. 15, 1949 |